(12) United States Patent
Sekino et al.

(10) Patent No.: US 11,133,621 B2
(45) Date of Patent: Sep. 28, 2021

(54) ELECTRIC WIRE COVER

(71) Applicant: Yazaki Corporation, Tokyo (JP)

(72) Inventors: Tetsuya Sekino, Makinohara (JP); Daigo Yokoyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/021,104

(22) Filed: Sep. 15, 2020

(65) Prior Publication Data
US 2021/0091508 A1 Mar. 25, 2021

(30) Foreign Application Priority Data

Sep. 19, 2019 (JP) .............................. JP2019-170447

(51) Int. Cl.
*H01R 13/58* (2006.01)
*H01R 13/639* (2006.01)
*H02G 3/04* (2006.01)

(52) U.S. Cl.
CPC ........... *H01R 13/58* (2013.01); *H01R 13/639* (2013.01); *H02G 3/04* (2013.01)

(58) Field of Classification Search
CPC ................ H01R 13/582; H01R 13/506; H01R 13/62933; H01R 13/58; H01R 13/639; H02G 3/04
See application file for complete search history.

(56) References Cited

U.S. PATENT DOCUMENTS

| 7,021,959 | B2 * | 4/2006 | Tsuji ................... H01R 13/562 439/470 |
| D821,974 | S | 7/2018 | Ramanna et al. | |
| 10,249,976 | B1 | 4/2019 | Thomas et al. | |
| 10,665,980 | B2 * | 5/2020 | Saitoh ................ H01R 13/5825 |

FOREIGN PATENT DOCUMENTS

JP        2010-9788 A    1/2010

* cited by examiner

*Primary Examiner* — Briggitte R. Hammond
(74) *Attorney, Agent, or Firm* — Sughrue Mion, PLLC

(57) ABSTRACT

An electric wire cover includes a first cover and a second cover, the electric wire cover being to be attached to a connector and to cover and protect an electric wire drawn out from the connector. The first cover includes a side plate and a locking claw. The second cover includes a lock piece and a protective wall, the lock piece protruding in a direction in which the second cover is attached to the first cover, the lock piece being to lock the locking claw, the protective wall surrounding the lock piece. The protective wall includes an outer wall portion and side wall portions, the outer wall portion being provided with a first gap between the outer wall portion and an outer surface of the lock piece, the side wall portions being provided with second gaps between the side wall portions and side portions of the lock piece.

4 Claims, 10 Drawing Sheets

ELECTRIC WIRE COVER

The present application claims, priority to Japanese Patent Application No. 2019-170447 filed on Sep. 19, 2019, the entire content of which is incorporated herein by reference.

TECHNICAL FIELD

The present invention relates to an electric wire cover.

BACKGROUND

In a related art connector, an electric wre cover is attached to an end portion of the connector on a side from which an electric: wire is drawn out, i.e. an electric wire drawing-out side, and the electric wire drawn out from the connector is covered and protected by the electric wire cover. The electric wire cover includes an upper cover and a lower cover. The upper cover is provided with a holding projection, and the lower cover is provided with a holding piece that engages with the holding projection of the upper cover. A locking mechanism is comprised of the holding projection and the holding piece (see, for example, JP2010-009788A).

The electric wire cover is therefore attached to the connector on the electric wire drawing-out side of the connector so as to cover the electric wire. When the upper cover and the lower cover are attached to each other, if a worker performs the attaching operation of the upper cover and the lower cover while being in a wrong posture, an excessive force may be applied to the holding piece protruding from the lower cover. An external force may also be applied to the holding piece at the time of conveyance or the like of the lower cover. Then, the holding piece may be damaged or broken by the excessive three or the external force applied thereto.

SUMMARY OF INVENTION

The present invention provides an electric wire cover configured to protect a locking mechanism configured to maintain a pair of covers being engaged with each other.

According to an illustrative aspect of the present invention, an electric wire cover includes a first cover and a second cover, the first cover and the second cover being configured to be attached to each other, the electric wire cover being configured to be attached to a connector and to cover and protect an electric wire drawn out from the connector. The first cover includes a side plate having an outer surface and a locking claw protruding from the outer surface off the side plate. The second cover includes a lock piece and a protective wall, the lock piece protruding in a direction in which the second cover is attached to the first cover, the lock piece being configured to lock the locking claw, the protective wall surrounding the lock piece. The protective wall includes an outer wall portion and side wall portions, the outer wall portion being provided with a first gap between the outer wall portion and an outer surface of the lock piece, the side wall portions being provided with second gaps between respective one of the side wall portions and respective side portions of the lock piece.

BRIEF DESCRIPTION OF DRAWINGS

FIGS. 4A and 4B are views showing a locking mechanism, in which FIG. 4A is a perspective view of a first locking portion and in which FIG. 4B is a perspective view of a second locking, portion;

FIGS. 9A and 9B are views showing a state where the first cover and the second cover are being attached to each other in a wrong posture, in which FIG. 9A is a perspective view of the electric wire cover and in which FIG. 9B is a front view of the locking mechanism;

FIGS. 10A and 10B are views showing a state of the locking mechanism when the first cover and the second cover are attached to each other in a wrong posture, in which FIG. 10A is a cross-sectional view taken along line C-C in FIG. 9B and in which FIG. 10B is a cross-sectional view taken along line D-D in FIG. 10A.

DESCRIPTION OF EMBODIMENTS

Figure 1:
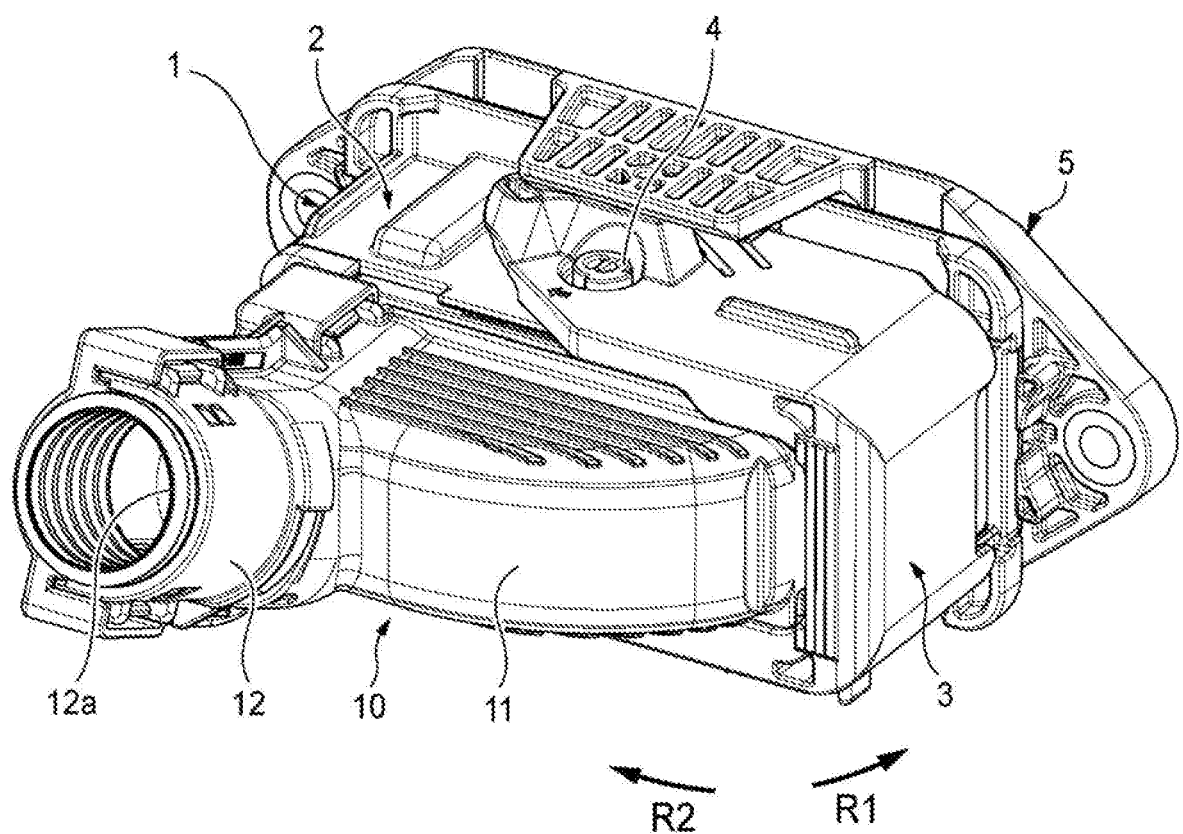
FIG. 1 is a perspective view of a connector attached with an electric wire cover: according to an embodiment of the present invention.

Hereinafter, an embodiment of the present invention will be described with reference to the drawings, FIG. 1 is a perspective view of a connector 1 attached with an electric wire cover 10 according to an embodiment of the present invention. As shown in FIG. 1, the electric wire cover 10 according to the present embodiment is attached to a rear end of the connector 1.

The connector 1 to which the electric wire cover 10 is to be attached is a lever-type connector including a connector body 2 and a U-shaped lever 3 attached to the connector body 2 from a rear side of the connector body 2. The connector body 2 has boss portions 4 on both side surfaces thereof, and the lever 3 is rotatably supported by the boss portions 4.

The connector 1 is to be attached to and detached from a mating connector 5 at a front end side thereof. When fitting the connector Ito the mating connector 5, by rotating the lever 3 in a direction (a direction of an arrow R1 in FIG. 1), the mating connector 5 locked to the lever 3 is pulled toward the connector body 2. When detaching the connector 1 from the mating connector by rotating the lever 3 m the other direction (a direction of an arrow R2 in FIG. 1), the mating connector 5 locked to the lever 3 is pushed out from the connector body 2. In this way, in the connector 1 including the lever 3, a fitting force and a detaching force with respect to the mating connector 5 are applied by rotating the lever 3, and the connector 1 can be easily fitted and detached.

The electric wire cover 10 includes a cover body 11 to be attached to a rear portion of the connector body 2, and an electric wire guiding portion 12 having a cylindrical shape and being on a rear portion of the cover body 11, the rear portion being opposite to a side at which the cover body 11 is attached to the connector body 2. The electric wire guiding portion 12 is provided at the rear portion of the cover body 11 closer to one end in a longitudinal direction of the cover body 11 and the connector body 2 than the other end thereof in the longitudinal direction, the lever 3 is attached to the connector body 2 at a position closer to the other end of the longitudinal direction of the cover body 11 and the connector body 2. The electric wire guiding portion 12 has an electric wire guiding hole 12a in which a plurality of electric wires (not shown) drawn out from the connector body 2 are to be bundled and drawn out therefrom.

In the connector body 2 attached with the electric wire cover 10, the plurality of electric wires are guided by the cover body 11 to the electric wire guiding portion 12 and bundled together, and are drawn out collectively from the electric wire guiding hole 12a of the electric wire guiding portion 12.

Figure 2:
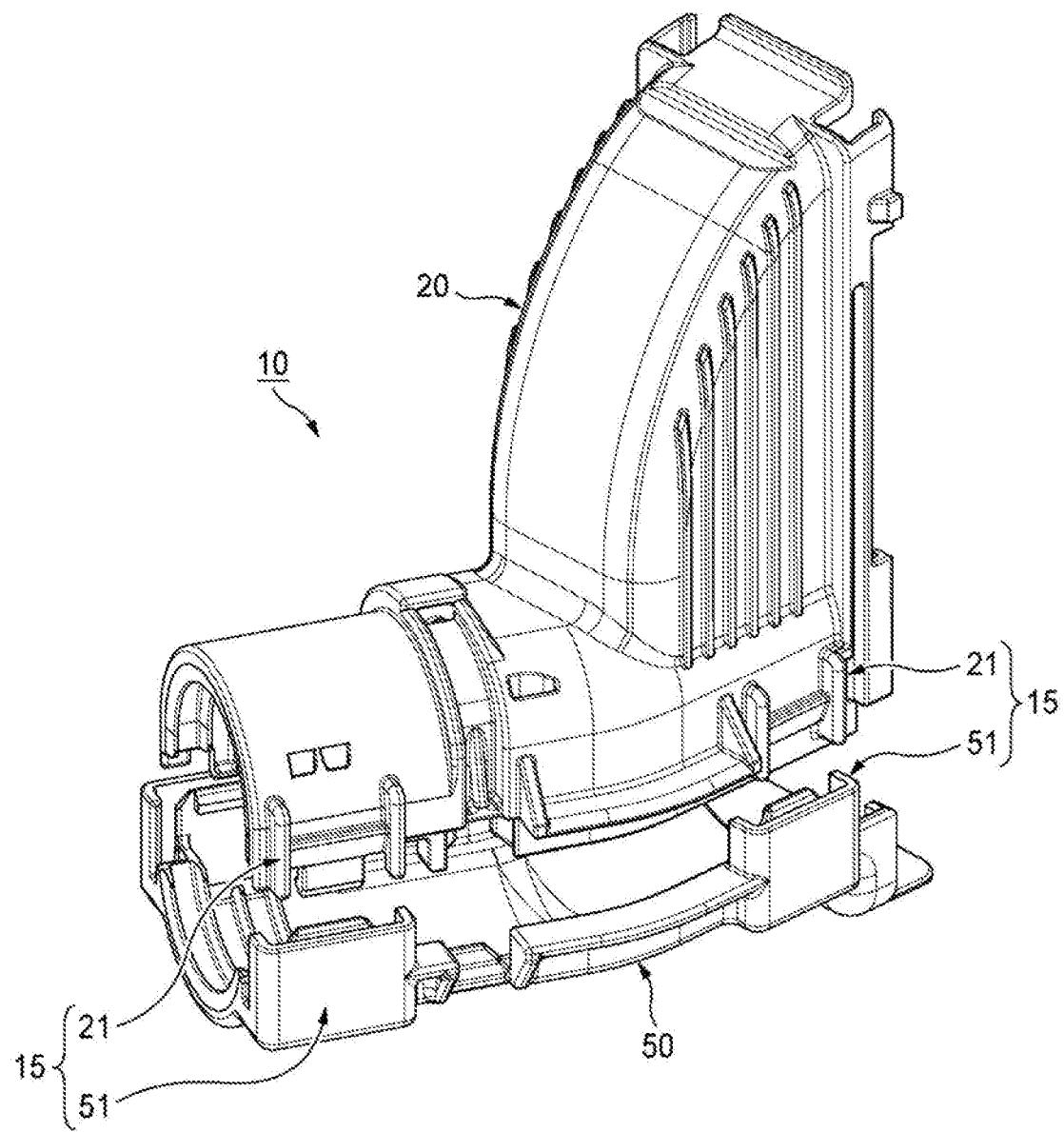
FIG. 2 is a perspective view of a first cover and a second cover of the electric wire cover according, to the present embodiment.
Figure 3:
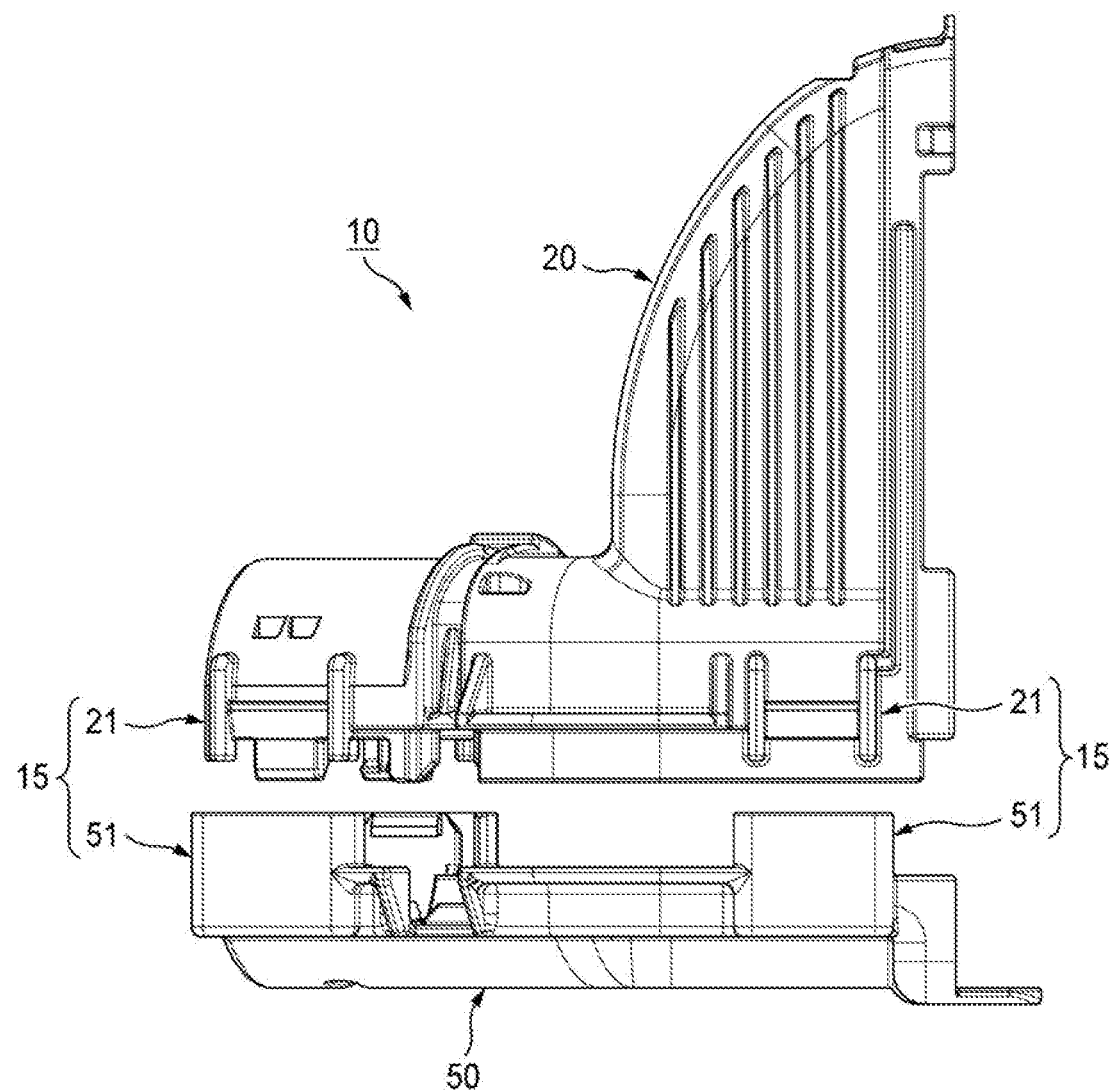
FIG. 3 is a side view of the first cover and the second cover of the electric wire cover according to the present embodiment.

FIGS. 2 and 3 are respectively a perspective view and a side view of a first cover 20 and a second cover 50 of the electric wire cover 10 according to the present embodiment. As shown in FIGS. 2 and 3, the electric wire cover 10 is comprised of two divided bodies divided along an axis of the electric wire guiding portion 12. One divided body is the first cover 20, the other divided body is the second cover 50, and the electric wire cover 10 is provided by attaching the first cover 20 and the second cover 50 to each other. Each of the first cover 20 and the second cover 50 is made of a synthetic resin having electrical insulation properties. The first cover 20 and the second cover 50 are engaged with each other by means of a plurality of locking mechanisms 15. Each locking mechanism 15 includes a first locking portion 21. provided at an edge portion of the first cover 20 and a second locking portion 51 provided on an edge portion of the second cover 50.

Figure 4A:
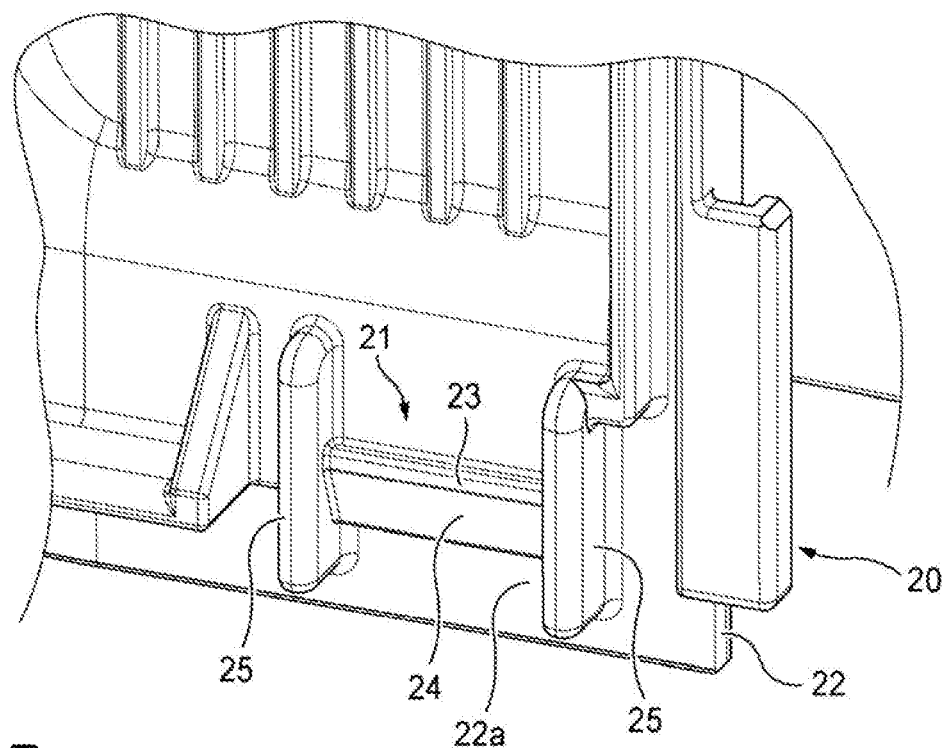
Figure 4B:
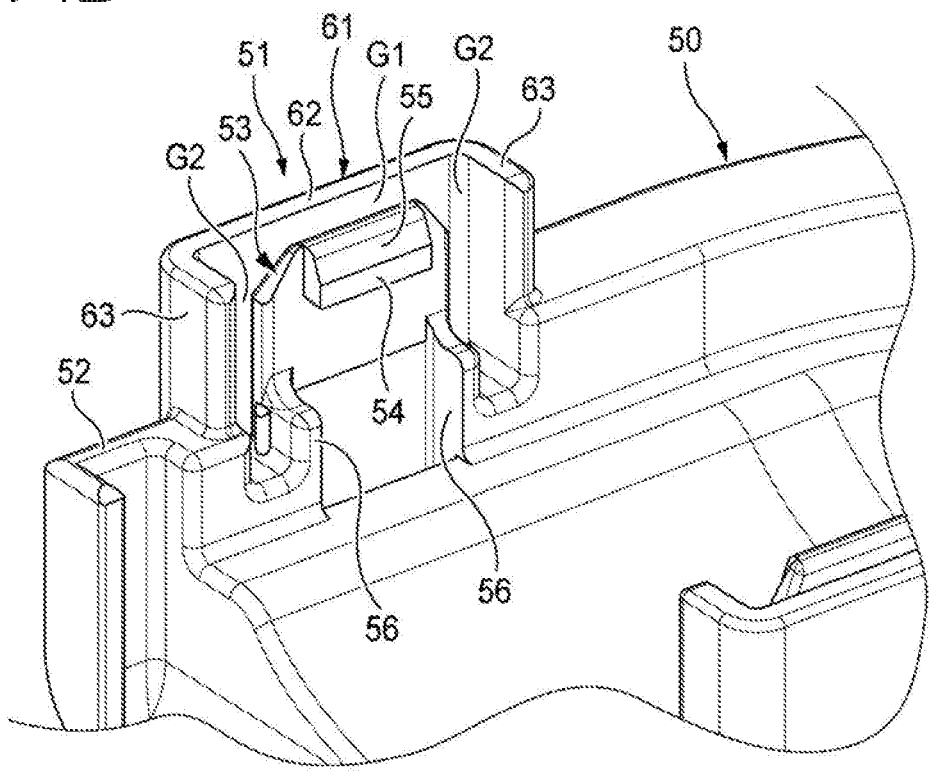
Figure 5:
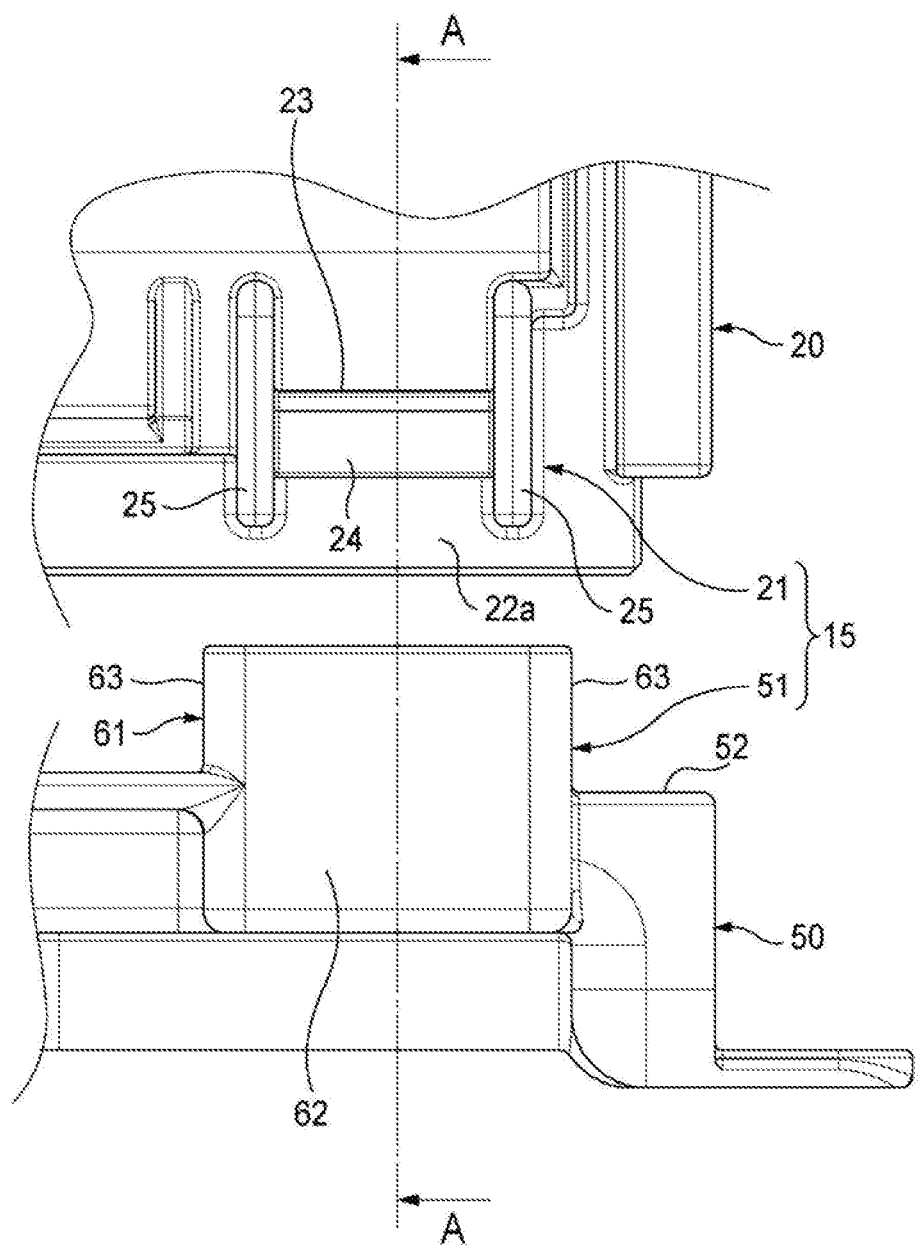
FIG. 5 is a front view of the locking mechanism.

FIGS. 4A and 4B are views showing each locking mechanism 15, where FIG. 4A is a perspective view of the first locking portion 21, and FIG. 4B is a perspective view of the second locking portion 51. FIG. 5 is a front view of the locking mechanism 15. FIG. i is a cross-sectional. view taken along line A-A, in FIG. 5.

Figure 6:
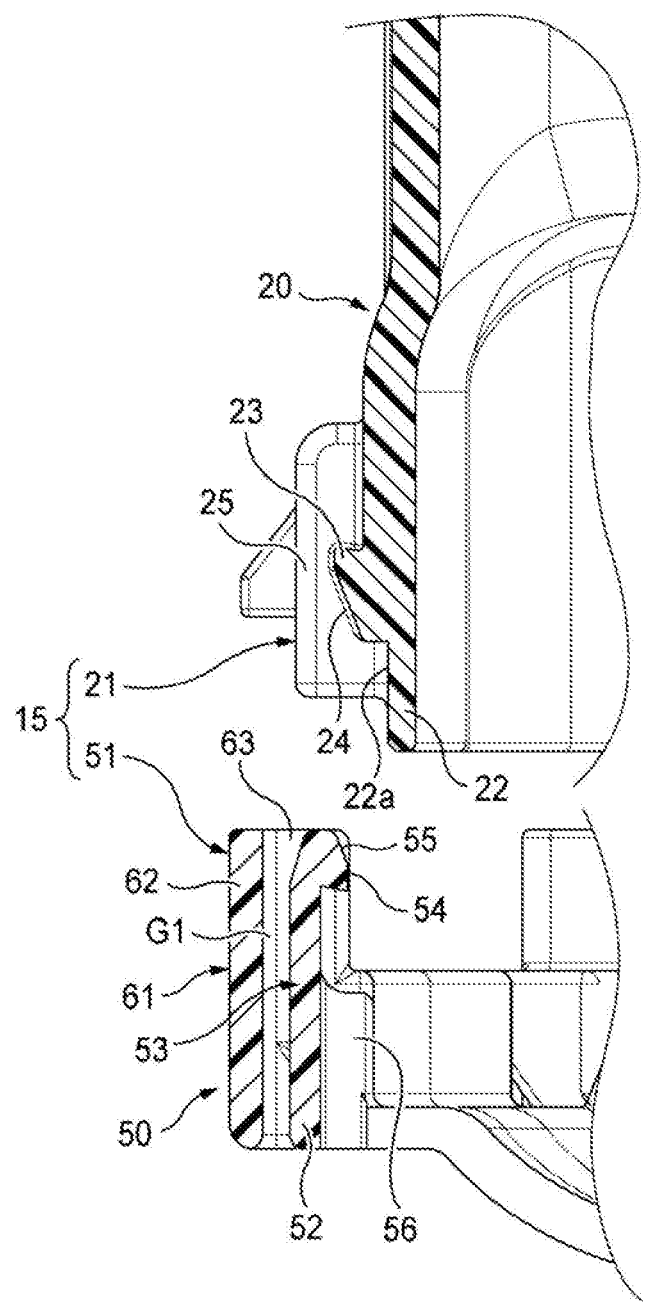
FIG. 6 is a cross-sectional view taken along line A-A in FIG. 5.

As shown in FIGS. 4A, 5, and 6, the first locking portion 21 has a locking claw 23 provided on an outer surface 22a of a side plate 22 of the first cover 20. The locking claw 23 protrudes from the outer surface 22a of the side plate 22. The locking claw 23 extends along a direction orthogonal to a direction in which the first cover 20 is attached to the second cover 50. The locking claw 23 has a guide surface 24 that is gradually inclined inward in the direction in which the first cover 20 is attached to the second cover 50. In other words, the thickness of the locking claw 23 gradually decreases toward the direction in which the first cover 20 is attached to the second cover 50.

Further, the lust locking portions 21 have protective ribs 25 provided on both sides of the locking claw 23. These protective ribs 25 protrude from the outer surface 22a of the side plate 22 and extend along the direction in which the first cover 20 is attached to the second cover 50.

As shown in FIGS. 4B, 5, and 6, the second locking portion 51 has a lock piece 53. The lock piece 53 has a plate shape, and protrudes from the side plate 52 of the second cover 50 toward a direction in which the second cover 50 is attached to the first cover 20. A claw portion 54 is provided on an inner surface of the took piece 53 at a distal end of the lock piece 53. The claw portion 54 extends along the direction in which the second cover 50 is attached to the first cover 20. The claw portion 54 has a guide surface 55 that is gradually inclined outward in the direction in which the second cover 50 is attached to the first cover 20. In other words, the claw portion 54 has a tapered surface (the guide surface 55) on an inner surface thereof in which the thickness of the claw portion 54 decreases toward the direction in which the second cover 50 is attached to the first cover 20. Reinforcement ribs 55 are provided on a base portion of the lock piece 53. These reinforcement ribs 56 are provided along both edges of the lock piece 53. In other words, the reinforcement ribs 56 are provided at both edges of the lock piece 53 in a width direction of the lock piece 53.

The second locking portion 51 has a protective wall 61 surrounding the lock piece 53 on an outer side thereof. The protective wall 61 includes an outer wall portion 62 and side wall portions 63. The outer wall portion 62 is provided with a gap G1 (first gap) between the outer wall portion 62 and an outer surface of the lock piece 53 The side wall portions 63 are respectively provided with a gap G2 (second gap) between respective one of the side wall portions 63 and respective one of the side portions of the lock piece 53 (side ends of the lock piece 53). The gap GI between the lock piece 53 and the outer wall portion 62 is larger than a deflection amount of the lock piece 53 (the mount of deformation of the lock piece 53) that the lock piece 53 experiences when the lock piece 53 is locked to the locking claw 23 of the first locking portion 21. The gaps G2 between the lock piece 53 and the side wall portions 63 are spaces in which the protective ribs 25 of the first locking portion 21 are to be inserted into and accommodated therein. In the second locking portion 51, the periphery of the lock piece 53 is covered and protected by the protective wall 61.

Next, how the first cover 20 and the second cover 50 are to be attached to each other will be described. The first cover 20 and the second cover 50 of the electric wire cover 10 are combined with each other by first attaching the first cover 20 to the connector body 2 by having the first cover 20 slide onto the connector body 2 from one end side thereof and then fitting, the second cover 50 from the other end side to the connector body 2.

Figure 7A:
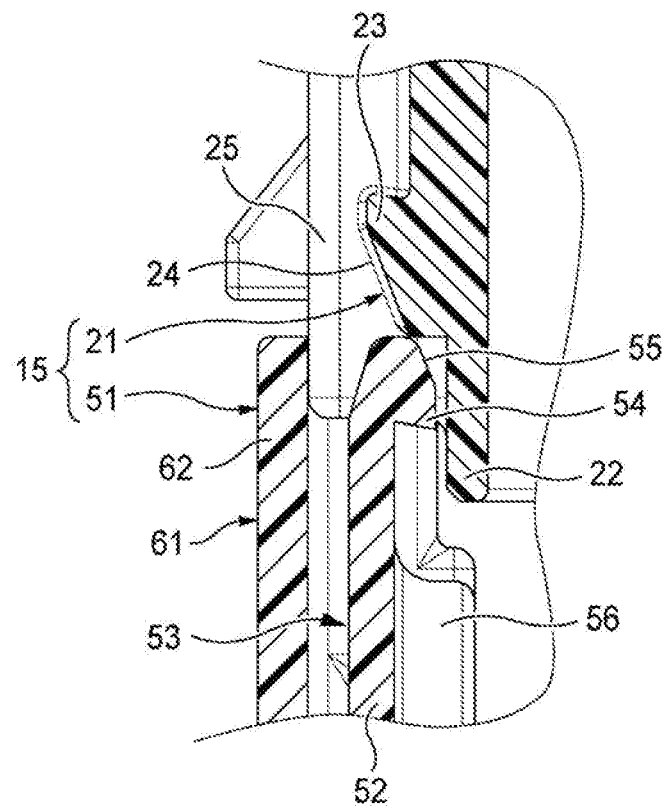
FIGS. 7A and 7B are views showing states in which the first locking portion and the second locking portion are being engaged with each other, and are cross-sectional views taken along line A-A of FIG. 5 in respective states.
Figure 7B:
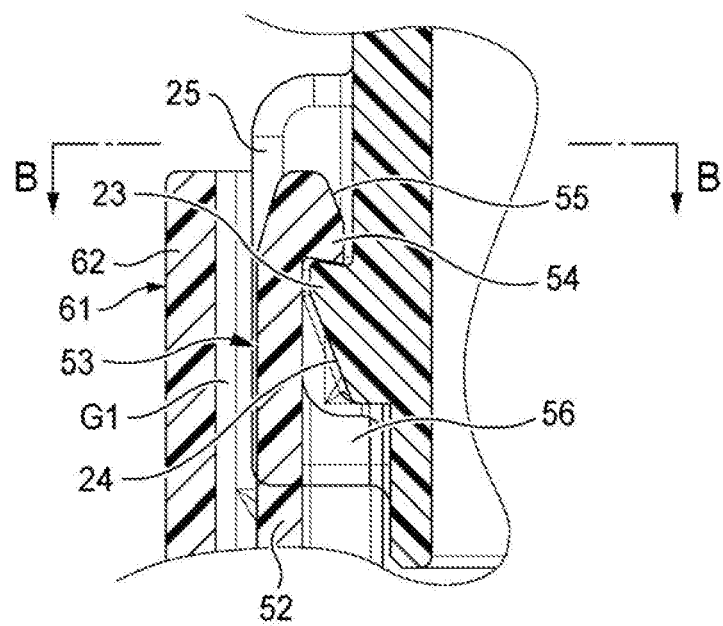
Figure 8:
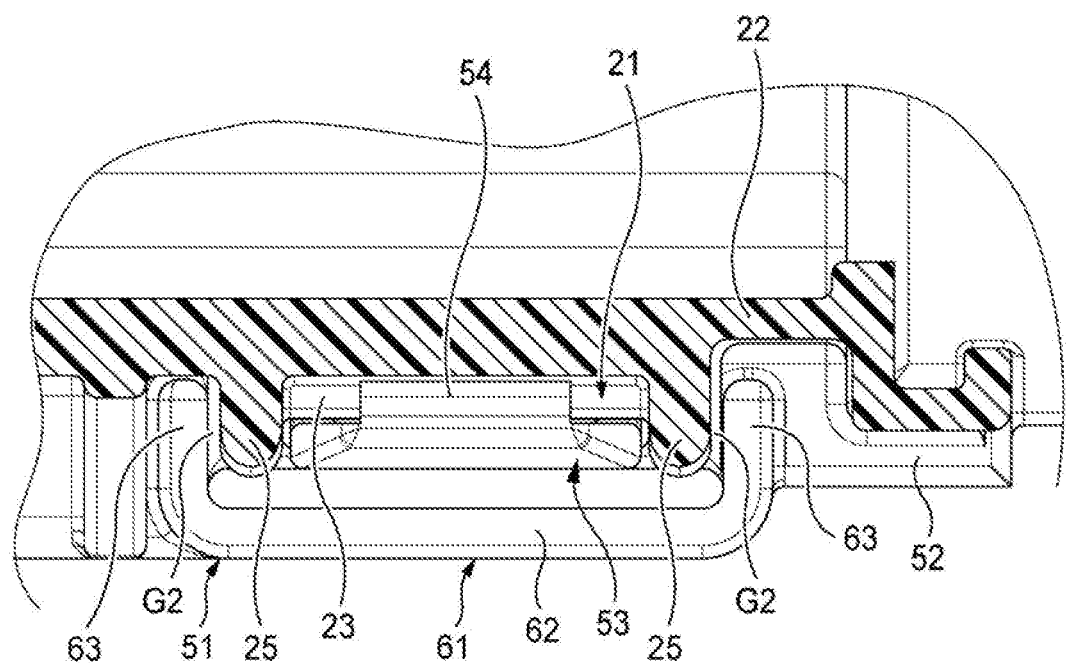
FIG. 8 is a cross-sectional view taken along line B-B of FIG. 7B showing the locking mechanism in which the first locking portion and the second locking portion are engaged with each other.

FIGS. 7A and 7B are views showing states where the first locking portion 21 and the second locking portion 51 are being engaged with each other, and are cross-sectional views taken along line A-A of FIG. 5 in the respective states. FIG. 8 is a cross-sectional view taken along line B-B of FIG. 7B showing the locking, mechanism 15 in which the first locking portion 21 and the second locking portion 51 arc engaged with each other.

When attaching the first cover 20 and the second cover 50 with each other, firstly the first cover 20 and the second cover 50 are brought close toward each ether with respective sides of the first cover 20 and the second cover 50 at which the first cover 20 and the second cover 50 are attached to each other. Then, the first locking portion 21 of the first cover 20 is fitted into the protective wall 61 of the second locking portion 51 of the second cover 50.

Then, as shown in FIG. 7A, the protective ribs 25 of the first locking portion 21 enter inner sides of the side wall portions 63 of the protective wall 61 of the second locking portion 51. At this time, the guide surface 24 of the locking claw 23 of the first locking portion 21 and the guide surface 55 provided on the claw portion 54 of the lock piece 53 of the second locking portion 51 contact each other.

Also, by further pushing the first cover 20 and the second cover 50 toward each other, the guide surface 24 of the locking claw 23 and the guide surface 55 of the claw portion 54 of the lock piece 53 slide on each other. Then the lock piece 53 is pressed outward and is elastically deformed.

Then, as shown in FIGS. 7B and 8, when the claw portion 54 of the lock piece 53 gets over the locking claw 23, the elastically deformed lock piece 53 is restored, and the claw portion 54 of the lock piece 53 locks the locking, claw 23. As a result, the first locking portion 21 and the second locking portion 51 are locked with each other as the locking mechanism 15, thereby making the first cover 20 and the second cover 50 are engaged with each other to form the electric wire cover 10.

In a state where the first cover 20 and the second cover 50 are attached to each other in this manner, the protective ribs 25 of the first lock portion 21 inserted and accommodated in the gaps G2 and the side wall portions 63 of the protective wall 61 are disposed on both sides of the lock piece 53 of the second lock portion 51. Thus, both side portions of the lock piece 53 are protected by the protective ribs 25 and the side wall portions 63, i.e. protected by two walls.

Figure 9A:
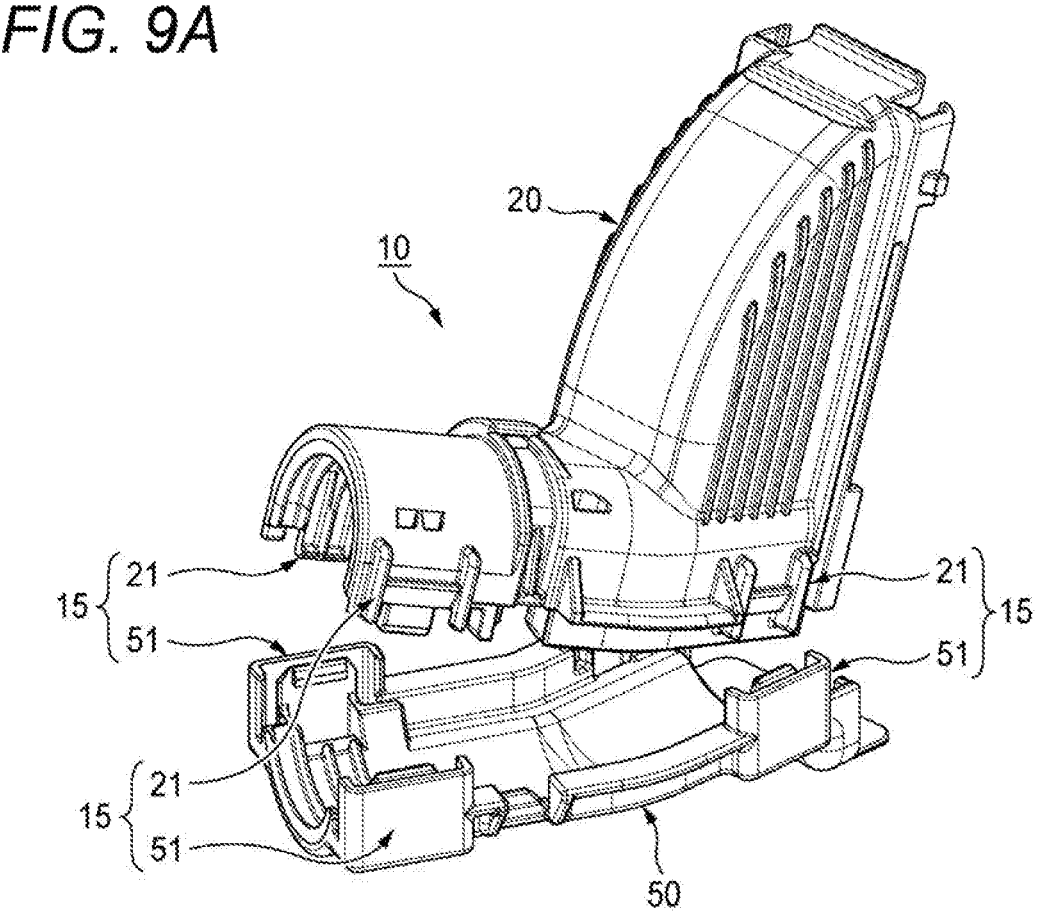
Figure 9B:
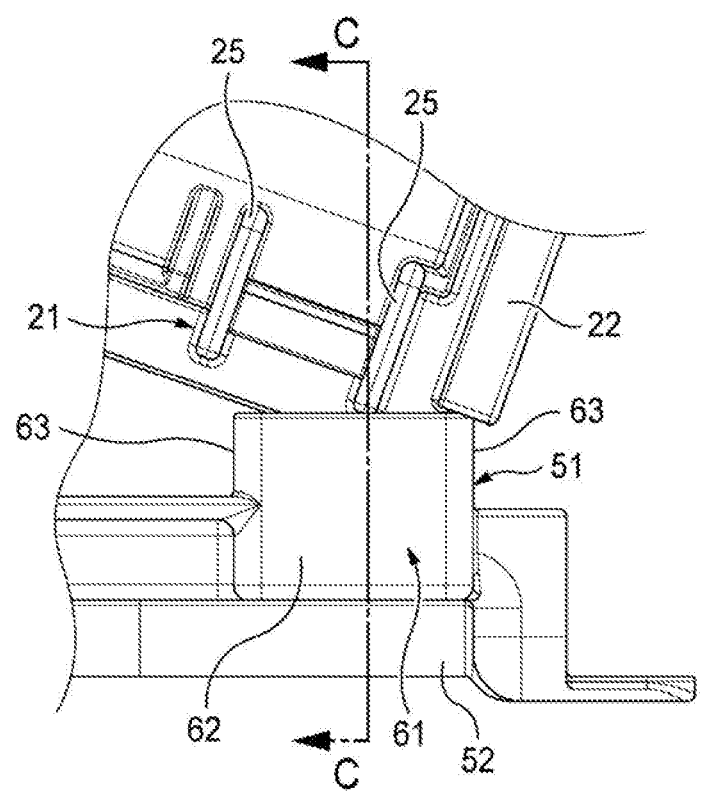
Figure 10A:
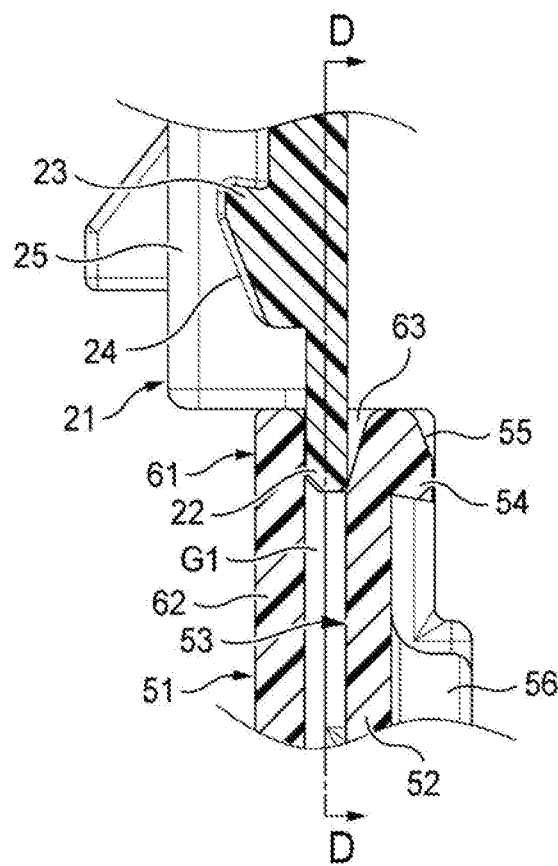
Figure 10B:
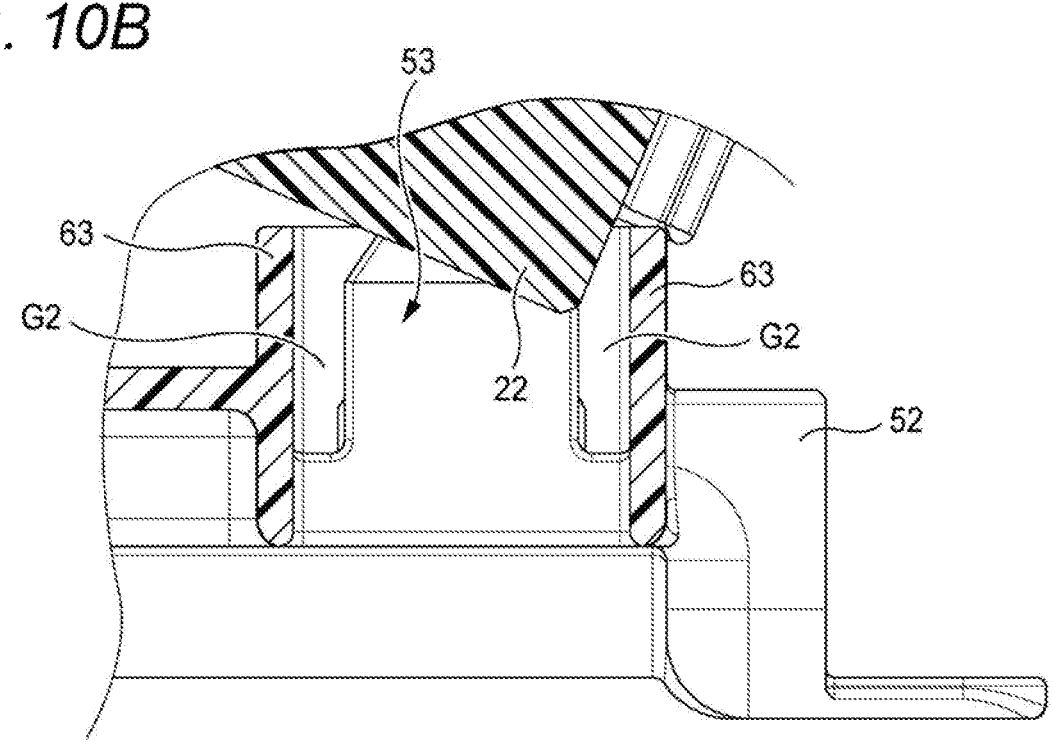

FIGS. 9A and 9B are views showing a state where the first cover 20 and the second cover 50 are attached to each other in a wrong posture, where FIG. 9A is a perspective view of the electric wire cover 10, and FIG. 9B is a front view of the locking mechanism 15. FIGS. 10A and 10B are views showing a state of the locking mechanism 15 when the first cover 20 and the second cover 50 are attached to each other in a wrong posture, where FIG. 10A is a cross-sectional view taken along line C-C in FIG. 9B, and FIG. 10B is a cross-sectional view taken along line D-D in FIG. 10A.

Incidentally, when the first cover 20 and the second cover 50 are to be attached, a worker may perform the assembly operation while keeping the first cover 20 and the second cover 50 in a wrong posture. For example, as shown in FIG. 9A, the assembly operation may be provided in a state where the first cover 20 and the second cover 50 are inclined with respect to each other.

In this case, as shown in FIGS. 9B and 10A, a corner portion of the side plate 22 of the first cover 20 may enter the gap G1 between the lock piece 53 of the second locking portion 51 and the outer wall portion 62 of the protective wall 61. In such a case, as shown in FIG. 10B, the side plate 22 entering the gap G1 comes into contact with the edge of the side wall portion 63 of the protective wall 61, therefore further entry of the side plate 22 into the gap G1 is restricted, and thus the lock piece 53 is protected.

As described above, with the electric wire cover 10 according to the present embodiment, the second cover 50 has the protective wall 61 surrounding the lock piece 53. As a result, the lock piece 53 can be protected by the protective wall 61, and, for example, when the first cover .20 and the second cover 50 are being attached to each other or being transported, an external force is prevented from being applied to the lock piece 53, and breakage or damage of the lock piece 53 can be prevented, Also as described above, even if the corner portion of the side plate 22 of the first cover 20 enters the gap G1 between the lock piece 53 and the outer wall portion 62 of the protective wall 61 when the first cover 20 and the second cover 50 are being attached to each other, the side plate 22 entering the gap G1 comes into contact with the edge of one side wall portion 63 of the protective wall 61. As a result, further entry of the side plate 22 into the gap G1 is restricted, and damage or breakage that may be caused by an excessive force applied to the lock piece 53 can be prevented.

Moreover, when the first cover 20 and the second cover 50 are attached to each other and the lock piece 53 locks the locking claw 23, the protective ribs 25 are inserted into the gaps G2 between both the side portions of the lock piece 53 and the side wall portions 63 of the protective wall 61. As a result, both side portions of the lock piece 53 can be protected by the protective ribs 25 and the side wall portions 63 of the protective wall 61, i.e,, protected by two walls, and therefore breakage or damage of the lock piece 53 can be prevented more favorably.

Further, the rigidity of the lock piece 53 can be enhanced by the reinforcement ribs 56 provided on the base portion of the lock piece 53. As a result, breakage or damage of the lock piece 53 can be prevented more favorably.

Therefore, according to the electric wire cover 10 of the, present embodiment, it is possible to favorably protect the locking mechanisms 15 in which the first cover 20 and the second cover 50 are engaged with each other.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, an electric wire cover (10) includes a first cover (20) and a second cover (50), the first cover (20) and the second cover (50) being configured to be attached to each other, the electric wire cover (10) being configured to be attached to a connector (1) and to cover and protect an electric wire drawn out from the connector (1). The first cover (20) includes a side plate (22) having an outer surface (22a) and a locking claw (23) protruding from the outer surface (22a) of the side plate (22). The second cover (50) includes a lock piece (53) and a protective wall (61), the lock piece (53) protruding in a direction in which the second cover (50) is attached to the first cover (20), the lock piece (53) being configured to lock the locking claw (23). the protective wall (61) surrounding the lock piece (53). The protective wall (61) includes an outer wall portion (62) and side wall portions (63), the outer wall portion (62) being provided with a first gap (GI) between the outer wall portion (62) and an outer surface of the lock piece (53), the side wall portions (63) being provided with second gaps (G2) between respective one of the side wall portions (63) and respective side portions of the lock piece (53).

According to the electric wire cover having the above-described configuration, the second cover has the protective wall surrounding the lock piece. As a result, the lock piece can be protected by the protective wall, and, for example, when the first cover and the second cover are attached to each other or transported, an external force is prevented from being applied to the lock piece, and breakage or damage of the lock piece can be prevented. Further, even if a corner of the side plate of the first cover enters the gap between the lock piece and the outer wall portion of the protective wall when the first cover and the second cover are being attached, the side plate entering the gap comes into contact with an edge of one side wall portion of the protective wall. As a result, further entry of the side plate into the gap is restricted, and damage or breakage caused by an excessive force applied to the lock piece can be prevented.

The first cover (20) may include protective ribs (25) configured to be inserted into respective one of the second gaps (G2).

With this configuration, when the first cover and the second cover are attached to each other so that the lock piece locks the locking claw, the protective ribs are inserted into the gaps between both the side portions of the lock piece and the side wall portions of the protective wall. Thus, both sides of the lock piece can be doubly protected by the protective ribs and the side wall portions of the protective wall, and breakage or damage of the lock piece can be prevented more favorably.

Reinforcement ribs (56) may be provided on a base portion of the lock piece (53).

With this configuration, the rigidity of the lock piece can be enhanced by the reinforcement ribs provided on the base portion of the lock piece. As a result, breakage or damage of the lock piece can be prevented more favorably.

The first gap (G1) may be larger than an amount of deformation of the lock piece (53) when the lock piece (53) slides on the locking claw (23) to engage with the locking claw (23).

What is claimed is:

1. An electric wire cover comprising: a first cover; and a second cover, the first cover and the second cover being configured to be attached to each other, the electric wire cover being configured to be attached to a connector and to cover and protect an electric wire drawn out from the connector,
    wherein the first cover comprises: a side plate having an outer surface; and a locking claw protruding from the outer surface of the side plate,
    wherein the second cover comprises: a lock piece; and a protective wall, the lock piece protruding in a direction in which the second cover is attached to the first cover, the lock piece being configured to lock the locking claw, the protective wall respectively surrounding the lock piece,
    wherein the protective wall comprises: an outer wall portion; and side wall portions, the outer wall portion being provided with a first gap between the outer wall portion and an outer surface of the lock piece, the side wall portions being provided with second gaps between respective ones of the side wall portions and respective side portions of the lock piece,
    wherein the first cover comprises protective ribs configured to be inserted into respective ones of the second gaps, and
    wherein each of ends of the locking claw is connected to one of corresponding ones of the protective ribs, respectively.

2. The electric wire cover according to claim 1, wherein reinforcement ribs are provided on a base portion of the lock piece.

3. The electric wire cover according to claim 1, wherein the first gap is larger than an amount of deformation of the lock piece when the lock piece slides on the locking claw to engage with the locking claw.

4. The electric wire cover according to claim 1, wherein the first cover comprises: a pair of the locking claws disposed on opposite sides of the first cover, and wherein the second cover comprises: a pair of the lock pieces and a pair of protective walls, respectively disposed on opposite sides of the second cover.

* * * * *